Sept. 9, 1930.   J. R. BARKER   1,775,269
DISK IMPLEMENT
Filed April 22, 1929    2 Sheets-Sheet 1
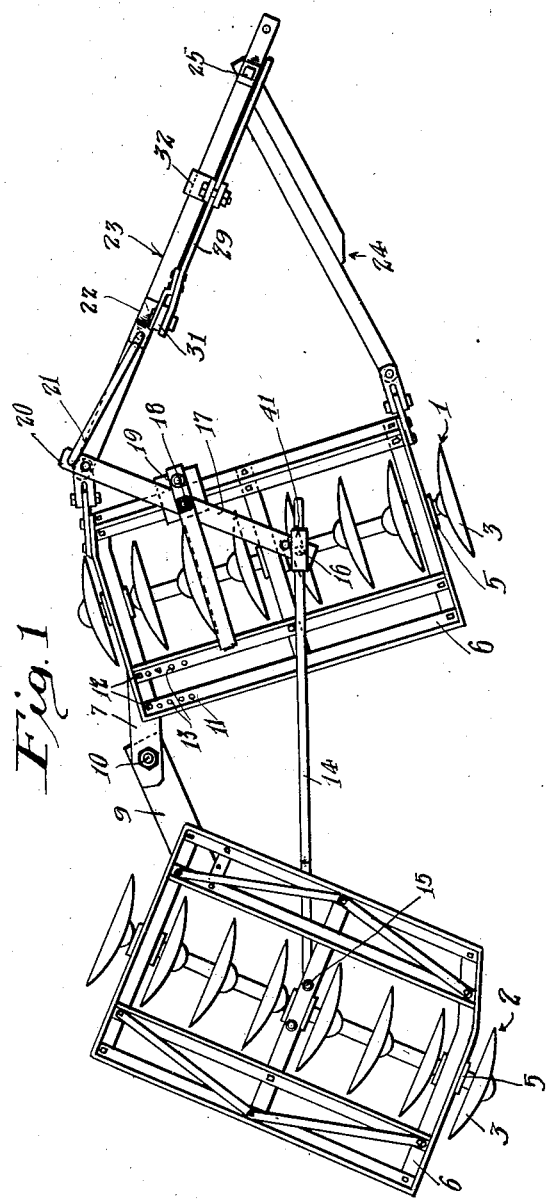
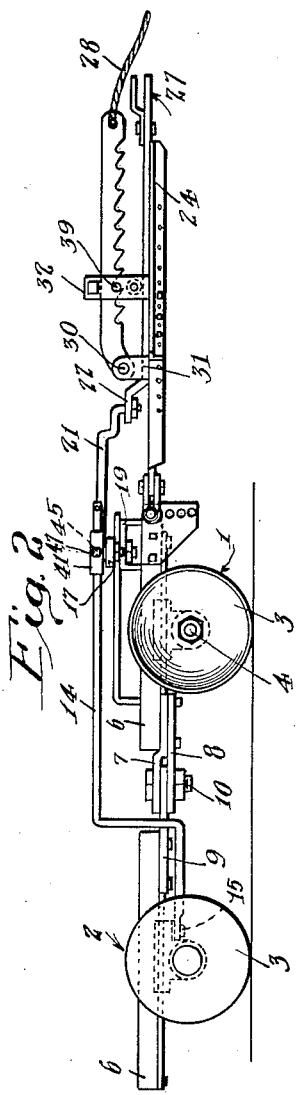
Inventor
Joseph R. Barker
By Lyon & Lyon
Attorneys

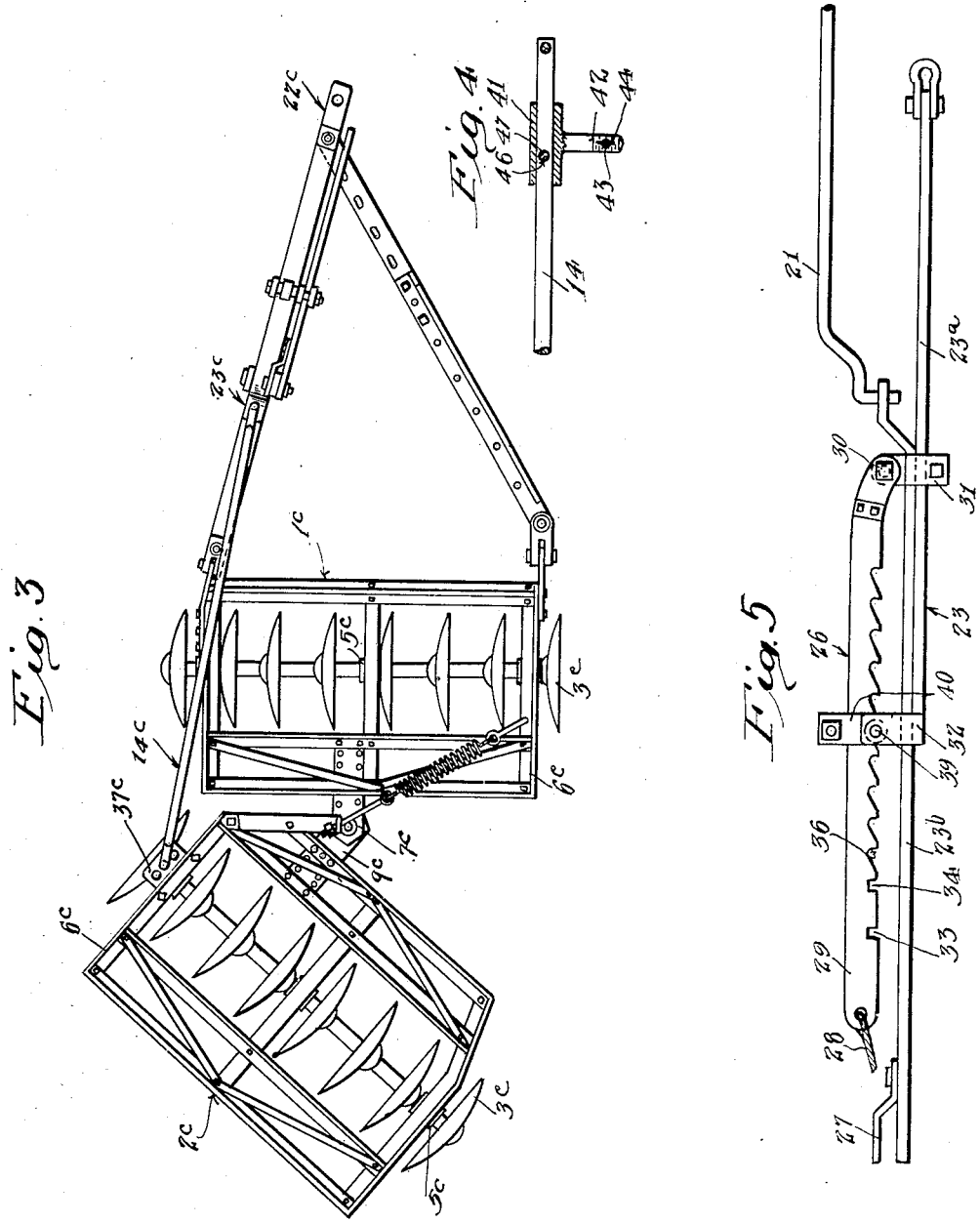

Patented Sept. 9, 1930

1,775,269

UNITED STATES PATENT OFFICE

JOSEPH R. BARKER, OF FALLBROOK, CALIFORNIA, ASSIGNOR TO B. V. CURRY, TRUSTEE

DISK IMPLEMENT

Application filed April 22, 1929. Serial No. 357,032.

This invention relates to disk implements, and more particularly to disk implements of the type disclosed in Heber F. Towner's Patents Nos. 1,627,355 and 1,627,356, which include two gangs of disks connected in tandem relation in a manner to provide what is termed an offset disk implement which may be drawn from off the center in relation to a tractor or device without imposing upon the tractor or draft device side draft sufficient to interfere with the free manipulation of the action of the draft device or implement.

The principal object of this invention is to provide a disk implement including two gangs of disks only which are connected together in tandem relation and provided with means for positively forcing the gangs into relative angular or working position irrespective of soil conditions.

Another object of this invention is to provide a single tandem disk implement including two gangs of disks connected in tandem relation and provided with a draft hitch connected to the forward gang which includes adjustment means, and which adjustment means are secured to the draft hitch in such a manner that irrespective of the adjustment made therein, the actuating means and the adjustment means does not vary in relation to the tractor or draft implement.

Another object of this invention is to provide a single tandem disk implement including two gangs only connected in tandem relation, the gangs being connected together in a manner to cause the disks of the rear gang to cut centers in relation to the disks of the forward gang, and including an adjustable hitch means connected with the forward gang of disks to permit the disk implement to be drawn in offset relation relative to a tractor or draft implement, and which adjustable means are connected with the rearward gang of disks in a manner to cause the rearward gang of disks to positively take and maintain a similar working angle, but opposed to the working angle adjusted to the disks of the forward gang by adjustment of the hitch means.

Another object of this invention is to provide a disk implement including two gangs of disks, each of which gangs includes a plurality of disks of the concave-convex type, the disks of the forward gang having their concave sides turned toward one side of the implement and the disks of the rearward gang having their concave sides turned toward the opposite side of the implement, means connecting the gangs of disks together at a plurality of spaced points, one of which points provides a hinged connection and the other of which connecting means provides means for either positively forcing the rearward gang to assume a working angle equivalent to the working angle adjusted to the forward gang but opposed to it, or for permitting the rearward gang to automatically assume such working angle.

Other objects and advantages of this invention it is believed will be apparent from the following detailed description of a preferred embodiment thereof as illustrated in the accompanying drawings.

In the drawings:

Figure 1 is a top plan view of a disk implement embodying this invention.

Figure 2 is a side elevation thereof.

Figure 3 is a top plan view of a modified form of disk implement embodying this invention.

Figure 4 is an enlarged fragmental sectional view taken substantially on the line 4—4 of Figure 1.

Figure 5 is an enlarged fragmental sectional view of the hitch mechanism embodied in this invention.

In the preferred embodiment of this invention illustrated in the accompanying drawings, 1 indicates a forward gang of disks, and 2 a rearward gang of disks. Each of the gangs of disks is substantially the same and includes a plurality of concave-convex disks 3 which are rigidly secured to the shaft 4. The shaft 4 is journaled in bearings 5 carried by the frames 6 of the respective gangs. The concave-convex disks 3 of the forward gang 1 are all turned toward one side of the frame of this gang, while the disk 3 of the rearward gang 2 are all turned toward the opposite side of the rearward gang.

Means are provided for connecting the gangs 1 and 2 together at two spaced points, one of which spaced points provides a hitch connection for the gangs 1 and 2 permitting the gangs to be angled to working positions to angles which are substantially the same but opposed; that is, to permit the gangs 1 and 2 to swing away from each other to substantially the same working angles.

The other of the connecting points between the gangs 1 and 2 includes a connection between the gangs 1 and 2 for forcing the gangs into the desired working angle, or a means of forcibly drawing the gangs of disks together from working angles or both for forcing the gangs apart to working angles, or for bringing the same back to the non-working position in a manner hereinafter to be described.

The connecting means for connecting the gangs 1 and 2 together to permit the gangs to be spread apart or angled to working positions preferably includes a pair of plates 7 and 8 which are secured to the frame 6 of the forward gang, and a single plate 9, which is preferably secured to the frame 6 of the rearward gang. The plate 9 fits between the plates 7 and 8 and is held in position by a vertically extending pivot pin 10. This manner of connection, in addition to providing a hitch connection between the gangs 1 and 2, provides, due to the width of the plates 7, 8 and 9, a hitch connection between the gangs 1 and 2 which is vertically rigid. By vertically rigid is meant that the gangs 1 and 2 are not permitted, when using this form of coupling means between the gangs, to oscillate independently vertically, but the position of the forward gang 1 will control the vertical position of the rearward gang 2, or if the rearward gang 2 is passing through a particular soil condition, its vertical position will control the position of the forward gang 1.

In addition, the vertically extending pivot pin 10 and its position determines whether the disks 3 of the rearward gang 2 will cut centers between the disks 3 of the forward gang, or will cut at the position off center in accordance with the adjusted position of either the two plates 7 and 8, or the single plate 9 of the frame 6 of the respective gangs. As illustrated in the drawings, the positions of the plates 7, 8 and 9 and the pivot pin 10 are such as to cause the disks 3 of the rearward gang to cut directly between the furrows formed by the disks 3 of the forward gang 1. The position of the plates 7 and 8 of the forward gang, however, may be adjusted along the rear frame member 11 of the frame 6 of the forward gang 1 by positioning the bolts 12 in the desired holes 13 formed in the rear member of this frame 6.

The connecting means between the gangs 1 and 2 for either forcibly causing the gangs 1 and 2 to take their angular positions, or operable to force the gangs 1 and 2 from working position, includes a stay-and-back-up bar 14, which is pivotally mounted to the rearward gang 2 at approximately the center thereof, as indicated at 15. The bar 14 is connected at 16 to the end of a fulcrum lever 17. The manner of connection of the bar 14 at the point 16 of the fulcrum lever 17 determines whether the gangs 1 and 2 will be forced to angular position by operation of the fulcrum lever 17 or will be forced out of working position.

The manner of connection at the point 16 will hereinafter be specifically described. The fulcrum lever 17 is pivotally connected as indicated at 18 to a bracket 19. The bracket 19 is secured to the frame 6 of the forward gang. The fulcrum lever 17 is secured at its opposite end 20 to a force pitch rod 21. The force rod 21 is connected with a draft link 23$^b$ forming a part of an A draft hitch constituting the coupling means between the tandem disk gangs and a tractor or other draft appliance.

The A draft hitch comprises as one side of the A, an angle adjustment bar or draft bar 23 of adjustable length, the angle adjustment or draft bar including the draft link 23$^b$ slidably secured as by guides 31 and 32 to an extension link 23$^a$. The two links are adjustably secured in any extended or collapsed position by means of an angle adjusting ratchet 26, the extension of the two links 23$^a$ and 23$^b$ controlling the working angle between the forward and rearward disk gangs.

The outer end of the link 23$^b$ is provided with a clevis or other device for coupling attachment to the tractor or other draft appliance, while the inner end of link 23$^a$ is pivotally connected to the frame 6 of the forward disk gang.

The other side of the A is formed by an adjustable offset bar 24, one end of which is pivotally connected as at 25 to the draft bar 23 adjacent the coupling clevis 27, while the other end of bar 24 is pivotally connected to the right hand end of the frame 6. The offset adjustment bar 24 may comprise two separate bars bolted together to provide an adjustable length for this bar to allow the amount of offset of the line of movement of the disk gangs with respect to the line of movement of the tractor.

The ratchet means 26 embodied in this invention are formed so that the control rope 28 thereof may be formed of a constant length, necessitating that the actuating end of the ratchet bar 29 remains a constant distance from the tractor, or point of connection with the tractor of the clevis 27. In order to accomplish this result, the ratchet 26 is preferably of the following construction:

The ratchet bar 29 is pivotally secured at 30 to a bracket 31. The bracket 31 also provides a slide through which the arm 23 slides in relation to the arm 23$^b$. A second bracket 32 is secured to the forward end of the arm 23$^a$. The bracket 31 is secured to the end of the arm 23$^b$. The ratchet bar 29 is formed with teeth 36 along its length in position to engage a ratchet pin 39 carried by the yoke extension 40 of the bracket 32. The pin 39 is adapted to engage within any one of the teeth 36. The ratchet bar 29 is disengaged from the pin 39 by merely pulling on the rope 28 to raise the teeth 36 above the pin 39 when it is desired to angle the gangs of disks apart. When it is desired to bring the gangs of disks together, the tractor is backed and the arm 23$^b$ slides over the arm 23$^a$, the teeth 36 of bar 29 being inclined forwardly to permit this action without raising the bar 29 from the pin 39.

Formed at the end of the ratchet bar 29 is a right turn notch 33 which engages the pin 39 when the implement is backed to hold the right ends of the front and rear gangs together beyond a parallel position so that the implement may be turned to the right easily or turned in a direction around this side of the implement. Also formed in the ratchet bar 29 is a neutral notch 34 which engages the pin 39 to hold the gangs in parallel relation when it is desired to back the implement or to pull the implement forwardly with the gangs in non-working or traveling position.

In connecting the end of the stay-and-back-up bar 14 with the fulcrum lever 17 at the point 16, the following means are preferably provided: A sleeve 41, through which the end of the bar 14 is slipped, is pivotally secured to the end of the fulcrum lever 17 by passing the pin 42 through a hole formed at 16. The pin 42 is held in position by passing a bolt or cotter pin through the hole 43 formed below the fulcrum lever 17. By securing a bolt, nut or like means, to the end of the stay-and-back-up bar 14, as indicated at 44, a stop means is provided which prevents drawing the bar 14 through the sleeve 41 more than a predetermined distance. With this construction, the rearward gang 2 is permitted to automatically assume a working angle corresponding to the forward gang 1 without forcing the rearward gang into such working position, but by merely adjusting the A hitch 22 of the forward gang 1 as illustrated in the Heber F. Towner Patent No. 1,627,356.

By forming a hole 45 through the sleeve 41, and a corresponding hole, or series of holes, 46 in the end of the stay-and-back-up bar 14, and passing a bolt through any pair of these holes, the stay-and-back-up bar 14 may be locked to the end of the fulcrum lever 17. Under this condition, when the arm 23 of the A hitch is lengthened or retracted in length by the force of the tractor pulling on the bar 23$^b$ when the ratchet 26 is released, the rearward gang 2 is forced to take the same working angle but in reversed or opposed position, that is, adjusted in the forward gang 1 by adjustment of the A hitch 22. Without passing the bolt 47 through the hole 45 and one of the holes 46, the stay-and-back-up bar 14 is free to slide in the sleeve 41.

In the modified form of this invention illustrated in Figure 3 substantially the same parts are used in the same combination so that the same numerals have been used with the addition of an exponent "C" except that in this modified form the two spaced points of the connection between the forward gang 1$^c$ and the rearward gang 2$^c$ are reversed so that the pivotal connection between the gangs formed by the plates 7$^c$, 8$^c$ and 9$^c$ is approximately intermediate the two gangs, and the stay-and-back-up bar 14$^c$ is connected by means of a bracket 37$^c$ secured to the frame 6$^c$ of the rearward gang 2$^c$ at one end thereof. In this modified form the stay-and-back-up bar 14$^c$ is connected directly to the rear end of the forward portion of the arm 23$^c$ of the A-hitch 22$^c$ and the use of the fulcrum lever 17 is eliminated.

The operation of the disk implement embodying my invention is:

The implement is first connected with a draft appliance at the clevis 27. The gangs 1 and 2 are assumed to be in parallel relation, or in non-working position. The implement may then be transported, rolling on the disks 3, to the point where it is desired to be used.

The operator of the draft appliance then grips the constant length rope 28, effecting an elongation of the arm 23 of the A hitch 22. This elongation of the arm 23 causes an adjustment to a working position of the forward gang 1$^c$, depending upon notch 36 of the ratchet bar 29 in which the operator engages the pin 39. The rearward gang 2 will either automatically assume the working angle, or will be forced into the working angle by pulling upon the stay-and-back-up bar 14, or 14$^c$, due to the elongation of the arm 23, or 23$^c$, of the implement. In the case of the modified form of this invention, the rearward gang would always be forced into the same working angle as the forward gang, but in the case of the preferred form, illustrated in Figures 1 and 2, the rearward gang might be permitted to assume the desired working angle automatically by removal of the bolt 47.

The draft appliance then pulls the disk implement in its adjusted position over the soil or surface to be disked. When the operator of the draft appliance desires to turn the implement to the left, he merely turns the tractor to the left and the implement being adjusted follows as desired. When desiring to turn the implement to the right, the operator backs the tractor until the pin 39 is engaged in the notch 34.

In case the bolt 47 has been removed and the implement is turned to the right, the rearward gang will automatically run forward on turning to the right to bring the gangs 1 and 2 together at the right end. This action will take place satisfactorily in most cases. In cases where the soil conditions are peculiar such, for example, as in sandy soil, or on traveling upon a hill, the rearward gang 2 will not always run forward as desired. It is for this reason that the bolt 47 is provided and the positive force stay-and-back-up bar 14ᶜ is provided in the modified form of this invention.

Having fully described my invention, it is to be understood that I do not wish to be limited to the details herein set forth, but my invention is of the full scope of the appended claims.

I claim:

1. In a single tandem disk implement, the combination of a forward gang of disks, a rearward gang of disks, means for connecting the forward gang of disks to the rearward gang of disks in tandem relation, means for connecting a draft appliance to the forward gang of disks and including an adjustable longitudinally extensible offset bar, and a longitudinal extensible angle adjustment bar, the angle adjustment bar being formed of two portions, ratchet means for adjustably connecting the portions together, and means connecting the forward portion of the angle adjustment bar at one end thereof to one end of a fulcrumed lever at its other end, means for pivotally supporting the fulcrumed lever, and means connecting the other end of the fulcrumed lever with the rear gang of disks at a point spaced from the first said connecting means between the front and rear gangs of disks.

2. In combination with an implement of the class described, the combination of a hitch formed of two bars, one of said bars being adjustable in length longitudinally, the other of said bars being adjustable in length longitudinally, means for connecting the forward end of one of said bars pivotally with the other of said bars at a point near its end, the second of said bars being formed in two sections, a forward section and a rearward section, a ratchet bar connected with the forward section and a ratchet pin carried by the rearward section, and means for guidingly maintaining the said sections of the second bar in alignment.

3. In a single tandem disk implement, the combination of a forward gang of disks, a rearward gang of disks, means for connecting the forward and rearward gangs of disks in tandem relation, a hitch, the hitch being formed of two bars, one of said bars being adjustable in length longitudinally to provide an adjustable offset bar, the other of said bars being adjustable in length longitudinally to provide an angle adjustment bar for adjusting the angularity of the gangs of disks in working position, the latter said bar being formed of two sections, one of which section is connected at its rear with the forward gang of disks, and the other of which sections is pivotally connected at its forward end with the offset bar and is pivotally connected at its rear with a stay-and-back-up bar, the stay-and-back-up bar being pivotally connected with the rear gang at a point spaced from the first said connecting means between the gangs of disks, a ratchet bar pivotally connected with the second said section of the angle adjustment bar and extending forwardly, a ratchet pin carried by the other section of the angle adjustment bar, and means for guidingly maintaining the said sections of the angle adjustment bar in alignment.

4. In combination with an implement of the class described, the combination of a hitch formed of an offset bar and an angle adjustment bar, means for pivotally connecting the offset bar and the angle adjustment bar together, means for adjusting the length of the offset bar, means for adjusting the length of the angle adjustment bar, including a ratchet connected between two sections of said angle adjustment bar, and means connected with said ratchet bar and extending forwardly therefrom and being of fixed length for actuating the ratchet to permit adjustment of the angle adjustment bar.

5. In combination with an implement of the class described, the combination of a hitch including an angle adjustment bar formed of two sections, one of said sections being slidably mounted in relation to the other, means for guidingly maintaining the said sections in alignment, a ratchet bar pivotally secured to the forwardmost of said sections, and a ratchet pin carried by the other of said sections.

6. In a single tandem disk harrow, the combination of a forward gang of disks, a rearward gang of disks, means for connecting the forward and rearward gangs of disks in tandem relation, means for connecting a draft appliance to the forward gang of disks and including an adjustable longitudinally extensible offset bar, and a longitudinally extensible angle adjustment bar being formed in two sections, one of which is operatively connected with the forward gang of disks at its rear end and the other of which sections is slidably and guidingly mounted on the first of said sections, a ratchet bar pivotally mounted on the latter of said sections, a ratchet pin carried by the other of said sections in position to be engaged by a ratchet bar, means connecting the forwardmost of said sections with the rear gang including a fulcrumed lever, a stay-and-back-up bar, and means for slidingly connecting the stay-and-back-up bar and the fulcrumed lever.

Signed at Los Angeles, Calif., this 5th day of April, 1929.

JOSEPH R. BARKER.